UNITED STATES PATENT OFFICE.

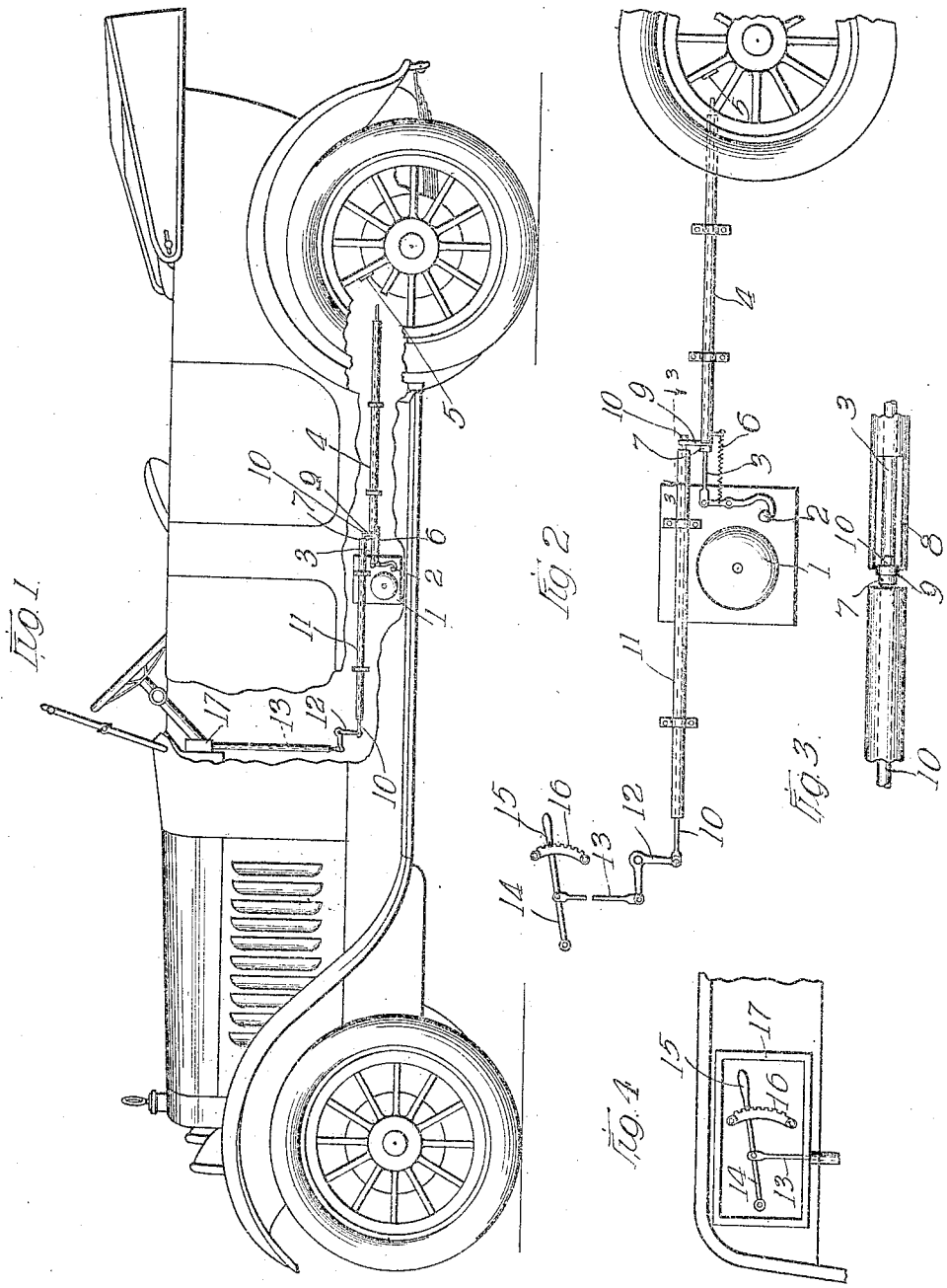

JOHN J. COUGHLIN, OF CHICAGO, ILLINOIS.

AUTOMOBILE ALARM DEVICE.

1,293,350.  Specification of Letters Patent.  Patented Feb. 4, 1919.

Application filed March 11, 1918. Serial No. 221,844.

*To all whom it may concern:*

Be it known that I, JOHN J. COUGHLIN, citizen of the United States, residing at Chicago, in the couny of Cook and State of Illinois, have invented certain new and useful Improvements in Automobile Alarm Devices; and I do hereby declare the following to be a full, clear, and exact description of the invention, such as will enable others skilled in the art to which it appertains to make and use the same.

This invention has for its object to provide certain new and useful improvements in burglar devices for automobiles in particular, and which may be applied to other vehicles if desired, and which may be rendered by the owner operative or inoperative, as desired, so that upon leaving the vehicle the said device may be set to operate and sound an alarm in the event that it is moved from its location during the owner's absence.

The invention includes manually operable means associated with an alarm device operable from a moving part of the vehicle which is disposed within a locked cabinet accessible only to the person possessing the key thereto for setting the alarm device to sound an alarm when the vehicle is moved, or to throw the alarm device out of operative position.

A further object of the invention is to provide an alarm device of the character set forth, the operating mechanism of which is entirely hidden from view and inaccessible to tampering therewith for the purpose of rendering same inoperative to perform its function.

A further object of the invention is to include as a part of the device a very loud sounding alarm adapted to attract immediate attention to the vehicle equipped therewith to avoid the escape of a thief with the same. The invention consists in the features of construction and combinations of parts hereinafter fully described and particularly claimed.

In the accompanying drawings illustrating the invention:

Figure —1— is a view in side elevation of an automobile equipped with an alarm device constructed in accordance with the invention, parts of same being broken away to expose the mechanism to view.

Fig. —2— is a fragmentary detail view showing the alarm mechanism on an enlarged scale, together with a part of the vehicle.

Fig. —3— is a fragmentary detail section on the line 3—3 of Fig. —2—.

Fig. —4— is a fragmentary detail view showing a portion of the inner face of the dash-board equipped with a cabinet housing the operating lever of the device.

My said alarm device comprises preferably a bell 1 suitably mounted below the body of the vehicle between the running boards thereof, and which may obviously be suitably housed to protect the same from mud and the like, which might otherwise be splashed thereon. Associated with said bell is a hammer or sounding device 2 disposed at one end of a lever pivotally supported between its ends contiguous to the bell, and which is pivotally connected at its other end with one end of a plunger rod 3. The latter extends longitudinally of the vehicle through a suitable guide and protecting tube 4 to a point contiguous to one of the rear wheels. The rear end of the rod 3 projects from the rear end of the tube 4 and when disposed in operative position projects into the path of a projection 5 suitably mounted on one of the spokes of a rear wheel. A spring 6 secured at one end to the hammer-lever 2 and at its other end to a contiguous portion of the tube 4 serves to maintain the hammer-lever 2 normally in contact with the bell 1; the same being adapted to be moved to substantially the position shown in Fig. —2— by movement of the rod 3 toward the bell 1 under the influence of the projection 5, and being adapted to be forcibly impelled against the bell 1 by means of the spring 6 when the projection 5 has passed the associated end of the rod 3.

On said rod 3 is a collar 7 which is disposed contiguous to the forward end of the tube 4 and is adapted to reciprocate within the latter. Said tube 4 is provided at said end with a longitudinal slot 8 into which the bifurcated projection 9 on a companion plunger rod 10 is adapted to pass; the rod 3 being adapted to be received in the recess in the lower end of the projection 9 and to reciprocate within the same when said rod 10 is disposed in a predetermined position. The rod 10 is longitudinally movable in the guide and supporting tube 11 also mounted below the body of the vehicle, and between the running boards, and at its other end is connected with one arm of the bell-crank lever 12 suitably pivotally supported on the vehicle body. The other arm of said bell crank lever is connected by means of a link 13 with a hand lever 14 which may be pivotally supported upon the dash board or upon the side wall of the body contiguous to the same at one end, and is provided at its other end with a suitable spring-held dog 15 adapted to engage in the arcuate rack 16, also rigidly mounted upon a rigid part of the body of the vehicle.

The said rack 16 and lever 14 are adapted to be housed in a small cabinet mounted on or contiguous to the dash-board and which is provided with a suitable door adapted to be locked with a removable key so as to prevent access to the lever 14 except when the said door is unlocked and opened. Extending from the bottom of the cabinet, indicated at 17 in Fig. —1—, is a vertically disposed tube through which the link 13 extends and is not only maintained hidden from view thereby, but also protected against tampering. Said tube extends preferably to or through the floor of the body.

When the lever 14 is disposed in its uppermost position, as shown in Figs. —1— and —2—, the rod 10 will be so positioned as to cause the projection 9 to engage the collar 7 on the rod 3 to hold said rod at the forward limit of its movement against the action of the spring 6 thereby throwing the rear end of said rod 3 out of the path of travel of the projection 5, thus permitting the vehicle to travel without sounding the bell 1. By moving the lever 14 to its lower position, however, the projection 9 will be moved out of engaging relation to the collar 7 thus permitting the rod 3 to be freely reciprocated, and being normally held so that its rear end is disposed in the path of the projection 5. Obviously, when in this position, if the vehicle is moved and the wheels thereof rotated, the said rod 3 will be reciprocated at regular intervals and each time that the projection 5 has passed the rear end of the rod 3 the spring 6 will suddenly return it to its normal position thereby causing the hammer 2 to strike and sound the bell 1. Said bell may be of the type of gong used on fire apparatus, and the like, so as to produce a very loud noise which will immediately attract the attention of the public and case apprehension of the thief or other unauthorized person operating the vehicle. The device is also adapted for use on fire and police vehicles for automatically sounding a gong as the vehicle travels to warn pedestrians and vehicles of its approach.

While I have illustrated the preferred embodiment of the invention in the accompanying drawings, it will be understood, of course, that the particular mechanism therein shown may be changed and varied as to best adapt it to various types of vehicles, and to produce the desired result without departing from the invention as defined in the appended claims.

I claim as my invention:

1. An alarm device for vehicles including a bell, a hammer for sounding the same, a projection on a wheel of the vehicle, a spring-held plunger operatively connected with said hammer for actuating the same as said plunger is reciprocated, a rod having sliding connection with said plunger, a collar on the latter for limiting the relative movements of said rod and plunger in one direction, a hand-lever operatively connected with said rod for varying its position with respect to the plunger, said projection on a wheel of the vehicle adapted, when said hand lever is disposed in a predetermined position, to reciprocate the plunger as the vehicle moves, and means associated with the hand-lever for holding the same in position to maintain the same plunger in or out of engaging relation to said projection.

2. An alarm device for vehicles including a bell, a hammer for sounding the same, a projection on a wheel of the vehicle, a spring-held plunger operatively connected with said hammer for actuating the same as said plunger is reciprocated, a rod having sliding connection with said plunger, a collar on the latter for limiting the relative movements of said rod and plunger in one direction, a hand-lever operatively connected with said rod for varying its position with respect to the plunger, said projection on a wheel of the vehicle adapted, when said hand lever is disposed in a predetermined position, to reciprocate the plunger as the vehicle moves, and means associated with the hand-lever for holding the same in position to maintain the same plunger in or out of engaging relation to said projection, said bell, plunger, rod and hand-lever being mounted upon portions of the vehicle body not visible or easily accessible.

3. An alarm device for vehicles including a bell, a hammer for sounding the same, a projection on a wheel of the vehicle, a spring-held plunger operatively connected with said hammer for actuating the same as said plunger is reciprocated, a rod having sliding connection with said plunger, a collar on the latter for limiting the relative movements of said rod and plunger in one direction, a hand-lever operatively connected with said rod for varying its position with respect to the plunger, said projection on a wheel of the vehicle adapted, when said hand lever is disposed in a predetermined position, to reciprocate the plunger as the vehicle moves, and means associated with the hand-lever for holding the same in position to maintain the same plunger in or out of engaging relation to said projection, and housings on the vehicle body for the several aforesaid operative parts except the projection on the wheel for protecting said parts against tampering or other injury.

JOHN J. COUGHLIN.